US006422114B1

(12) United States Patent
Cunningham, Jr.

(10) Patent No.: US 6,422,114 B1
(45) Date of Patent: Jul. 23, 2002

(54) DRIVE SYSTEM FOR BOARD CUTTING MACHINE

(75) Inventor: Robert Ashley Cunningham, Jr., Argyle, TX (US)

(73) Assignee: NRG Industries, Inc., Carrollton, TX (US)

( * ) Notice: Subject to any disclaimer, the term of this patent is extended or adjusted under 35 U.S.C. 154(b) by 0 days.

(21) Appl. No.: 09/330,764

(22) Filed: Jun. 11, 1999

(51) Int. Cl.[7] .................................... B23D 7/10

(52) U.S. Cl. ..................... 83/435.2; 83/875; 83/436.6

(58) Field of Search ............................. 83/875, 436.6, 83/436.7, 436.75, 435.2, 436.15, 924, 422, 431, 420, 427, 421

(56) References Cited

U.S. PATENT DOCUMENTS 3,605,534 A 9/1971 Barr .............................. 83/5
3,804,242 A * 4/1974 Tall et al. .................. 83/106
3,832,922 A * 9/1974 Stout ........................ 83/422
3,863,530 A * 2/1975 Weidman .................... 83/422
3,917,505 A * 11/1975 Schulze ..................... 83/435
3,941,018 A 3/1976 Williams ...................... 83/5
3,996,824 A 12/1976 Cailey .......................... 83/5
4,041,822 A * 8/1977 Gabel ...................... 83/409.2
4,070,954 A 1/1978 Cailey ........................ 93/36.9
4,091,697 A 5/1978 Cailey ............................ 83/5
4,793,025 A * 12/1988 Melville et al. ........... 83/435.2
4,833,960 A * 5/1989 Patterson ..................... 83/420
4,983,081 A 1/1991 Cunningham, Jr. ............ 83/39
5,024,131 A * 6/1991 Weidman ...................... 83/436
5,086,681 A * 2/1992 Ruetschle et al. ......... 83/435.2
5,181,445 A * 1/1993 Cothrell ......................... 83/15
5,186,704 A 2/1993 Cunningham, Jr. .......... 493/18
5,271,304 A * 12/1993 Wygal et al. ................. 83/422
5,784,937 A * 7/1998 Wygal et al. ................. 83/422
5,875,697 A * 3/1999 Cole et al. ................. 83/435.2
6,128,989 A * 10/2000 Jones et al. ................... 83/156

OTHER PUBLICATIONS

Patent application Ser. No. 09/330,411.

* cited by examiner

*Primary Examiner*—M. Rachuba
*Assistant Examiner*—Kim Ngoc Tran
(74) *Attorney, Agent, or Firm*—Jenkens & Gilchrist

(57) ABSTRACT

A drive system for rotating rollers advancing a board through a board cutting machine. Sprockets and chains in the drive system are positioned such that adjustment of a set of rollers on one side of the board to accommodate varying board thicknesses will not require adjustment of a tension sprocket manually or by a spring.

40 Claims, 7 Drawing Sheets

DRIVE SYSTEM FOR BOARD CUTTING MACHINE

RELATED APPLICATIONS

This application is related to U.S. application Ser. No. 09/330,411, filed Jun. 11, 1999, entitled "Improved Tool Holder and Tab System for Board Cutting Machine", invented by R. Ashley Cunningham, the disclosure of which is incorporated by reference.

TECHNICAL FIELD

This invention relates generally to fiber board cutting machines and, more particularly, to an improved tool holder and tab system for cutting insulation fiber board of the type which has an impermeable barrier on one face thereof.

BACKGROUND OF THE INVENTION

Machines have heretofore been used to cut grooves in fiber board of a matted fiberglass type having a barrier on one face thereof, such as aluminum foil. U.S. Pat. No. 3,605,534 for such a machine was issued to William H. Barr in 1967. Subsequent to the Barr patent, several other fiber board cutting machine patents have issued with improvements thereto, including U.S. Pat. No. 3,941,018 issued to Jimmy L. Williams, and U.S. Pat. Nos. 3,996,824 and 4,091,697 issued to Ronald J. Cailey. The disclosures of the above-mentioned patents are included herein by reference.

In the prior art board cutting machines, a blade assembly is fixably mounted on a tool holder. A plurality of the prior art tool holders are adjustably positioned at predetermined spacing along the tool bar assembly, and the fiber board is fed through the cutting machine to form grooves spaced across the board. Adjustment of the position of the tool holder, including the blade assembly, results in grooves of different positions on the fiber board and thereby provides for forming the fiber board into duct work of different sizes and cross-section configurations.

In the prior art cutting machines, the blade assembly is permanently fixed to the tool holder. Different blade configurations are used to cut various groove profiles in the board as taught in the Barr patent (3,605,534). A need has existed for a tool holder that provides for adjustability of the blade position in the tool holder. A further need exists for a simple, inexpensive, reliable tab system for use in connection with the tool holder to position the tool holder to form grooves at correct spacings on the fiber board.

SUMMARY OF THE INVENTION

The present invention comprises an improved tool holder that provides for adjustability and interchangeability of blade assemblies and further provides that one tool holder may accept any one of a number of the blade assemblies for cutting grooves in fiber board of varying thickness.

In one embodiment, the present invention comprises an improved tool holder for a board cutting machine. The board cutting machine has an input side and an output side and a predetermined direction of feed of a board to be cut. The cutting machine includes at least one tool holder bar disposed transverse to the direction of feed of the board.

The improved tool holder comprises a first member having a bottom and at least one upstanding wall, the upstanding wall terminates in an outwardly turned flange that is adapted to be received on the tool holder bar of the board cutting machine. The first member has at least one downwardly disposed bracket for receiving an adjustment mechanism.

A blade assembly is removably attached to the adjustment mechanism, wherein the blade assembly may be adjustably moved in a transverse direction to the feed direction of the board. At least one blade is mounted on the attachment member.

The present invention further comprises a tab system for cutting grooves in a fiber board used for forming insulation duct work into a predetermined shape using the previously described board cutting machine. The tab system comprises at least one tool holder having a first blade assembly for cutting a board of a first predetermined thickness removably attached to an adjustment mechanism, wherein the blade assembly may be moved in a transverse direction to the feed direction of the board into the machine, as previously described, and a second blade assembly for cutting a board of a second predetermined thickness for interchanging with the first blade assembly. The second blade assembly is adapted to be removably attached to the adjustment mechanism, wherein the blade assembly may be moved in a transverse direction to the feed direction of the board into the machine.

A tab is disposed on the tool holder wherein the tab includes a first indicator mark for indicating the desired predetermined position of a first blade in the first blade assembly for cutting longitudinally a first side of a groove in material of a first predetermined thickness and a second indicator mark for indicating the desired predetermined position of a second blade in the first blade assembly for cutting longitudinally a second side of a first groove in a material of a first predetermined thickness. The first tab further includes a third indicator mark for indicating the desired predetermined position of a first blade in the second blade assembly for cutting longitudinally a first side of a first groove in material of second predetermined thickness and a fourth indicator mark for indicating the desired predetermined position of a second blade in the second blade assembly for cutting longitudinally a second side of a first groove in a material of a second predetermined thickness.

BRIEF DESCRIPTION OF THE DRAWINGS

The disclosed invention will be described with reference to the accompanying drawings, which show important sample embodiments of the invention and which are incorporated in the specification hereof by reference. A more complete understanding of the present invention may be had by reference to the following Detailed Description when taken in conjunction with the accompanying drawings, wherein.

DETAILED DESCRIPTION OF THE INVENTION

Figures 1A, 1B:
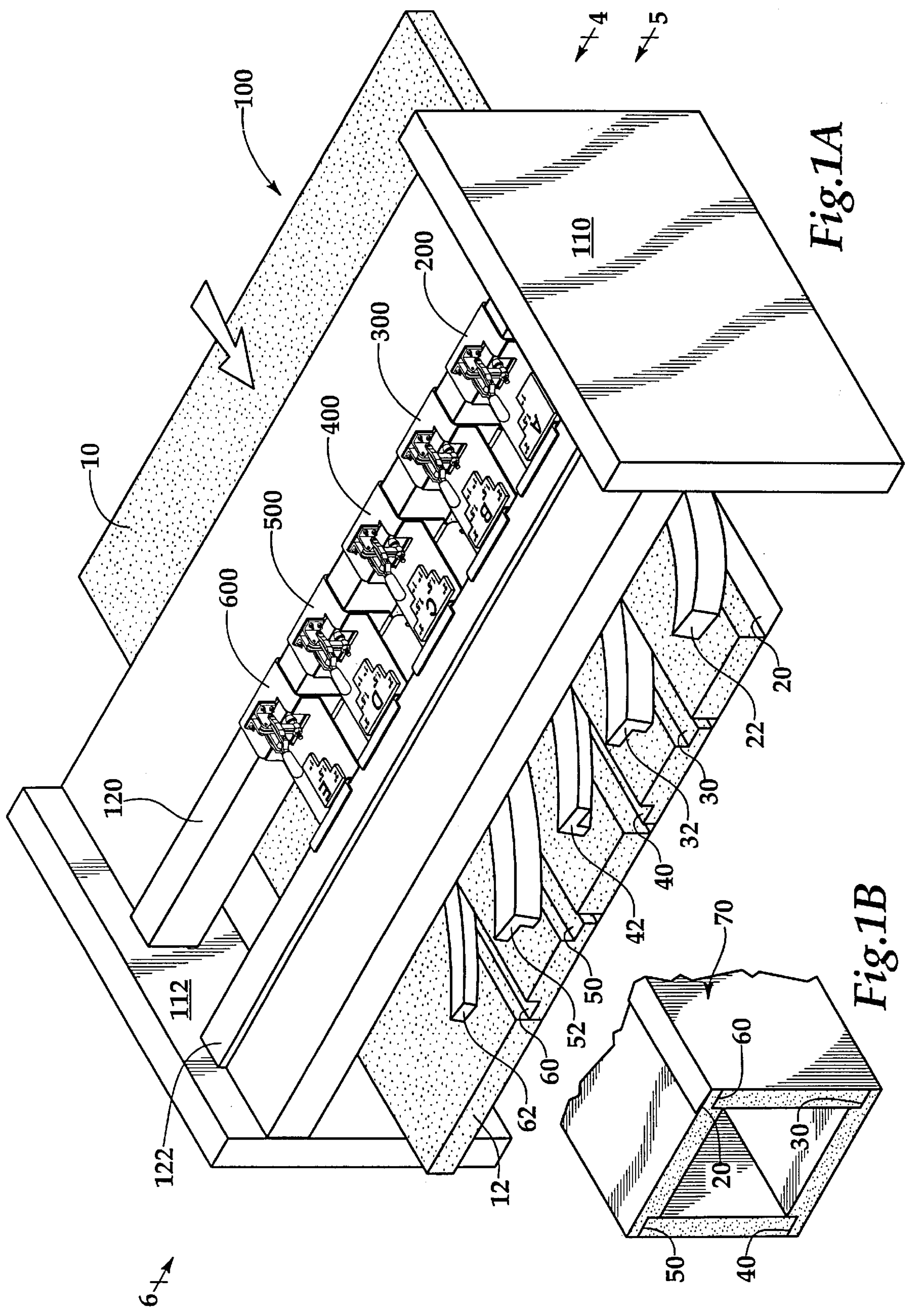
FIG. 1A is a perspective view of a tool holder and tab system of the present invention used in connection with a board cutting machine.
FIG. 1B is a perspective view of a duct formed from fiber board grooved by the tool holder of the present invention.

Reference is now made to the drawings wherein like reference characters denote like or similar parts throughout the Figures.

Referring now to FIG. 1A, therein is illustrated a perspective view of the board cutting machine 100 of the present invention. Fiber board material 10 is fed into the machine and forced through the machine by compression rollers as illustrated and described in U.S. Pat. Nos. 3,605,534 and 3,941,018. The board exits the machine 100 on the opposite side having grooves 20, 30, 40, 50 and 60, cut therein. The partial piece 12 of board 10 is not a part of a predetermined duct configuration and is either waste or recycled for other duct shapes. The material 22, 32, 42, 52 and 62 cut from grooves 20, 30, 40, 50 and 60 is illustrated as curved and partially removed from grooves 20, 30, 40, 50 and 60 for purposes of viewing the profile of the grooved board 10. Those skilled in the art will appreciate that the material 22, 32, 42, 52 and 62 will have to be manually removed from board 10. In other prior art embodiments of the cutting machine 100, the material 22, 32, 42, 52 and 62 will be extracted from grooves 20, 30, 40, 50 and 60 by the machine as taught in U.S. Pat. Nos. 3,996,824 and 4,091,697.

It will be appreciated by those skilled in the art that the board material may be of any suitable material which is useful as insulation for Heating, Ventilation and Cooling ("HVAC") duct work, and may include a facing on one side or both faces thereof. The facing may be foil or polymeric material. Such a board is presently available from suppliers including Owens-Corning Fiberglas, Johns-Manville corporation, Certainteed Corporation, Knauf Fiberglas and other suppliers and comprises fiberglass held together by a suitable binder with an impervious facing of aluminum foil on one side. It will be appreciated that the machine 100 and the tool holders 200, 300, 400, 500 and 600 can be used with any suitable insulation material compressed in a board shape.

In accordance with the present invention, the passing of the board 10 through the machine will result in a shiplap or other suitable cuts which remove the fiberglass and binder from a desired area such as indicated in the grooves 20, 30, 40, 50 and 60. The shiplap cuts 20, 30, 40, 50 and 60 provide for strength and integral sealing of the duct when assembled.

Referring now to FIG. 1B, therein is disclosed a typical assembled square one-piece HVAC duct 70 formed from a board cut as illustrated in FIG. 1A. Grooves 20, 30, 40, 50 and 60 are illustrated in their interlocked position.

Prior art machines capable of cutting such grooves for assembly into one-piece duct work, and the assembly of such duct work, are illustrated in the Barr patent, U.S. Pat. No. 3,605,534, and subsequent U.S. Pat. Nos. 3,941,018; 3,996,824; and 4,091,687, the disclosure of which is incorporated herein by reference.

It will be appreciated by those skilled in the art that ducts of rectangular, and even circular shape, may be formed using different spacing of the tool holders 200 through 600 and additional tool holders with differing blade assemblies in the board cutting machine 100.

Referring now again to FIG. 1A, the board cutting machine 100 includes two leg assemblies 110 and 112 disposed on either side of the machine and a bed and roller assembly (not shown, but of the type known in the prior art) that supports the board 10 as it is fed through the machine 100. Parallel tool bars 120 and 122 are positioned transverse to the feed direction of the board 10.

The tool bars 120 and 122 may be formed from material having various cross sections. In the present invention, the tool holder bars are formed from a tubular box beam.

Figures 2A, 2B:
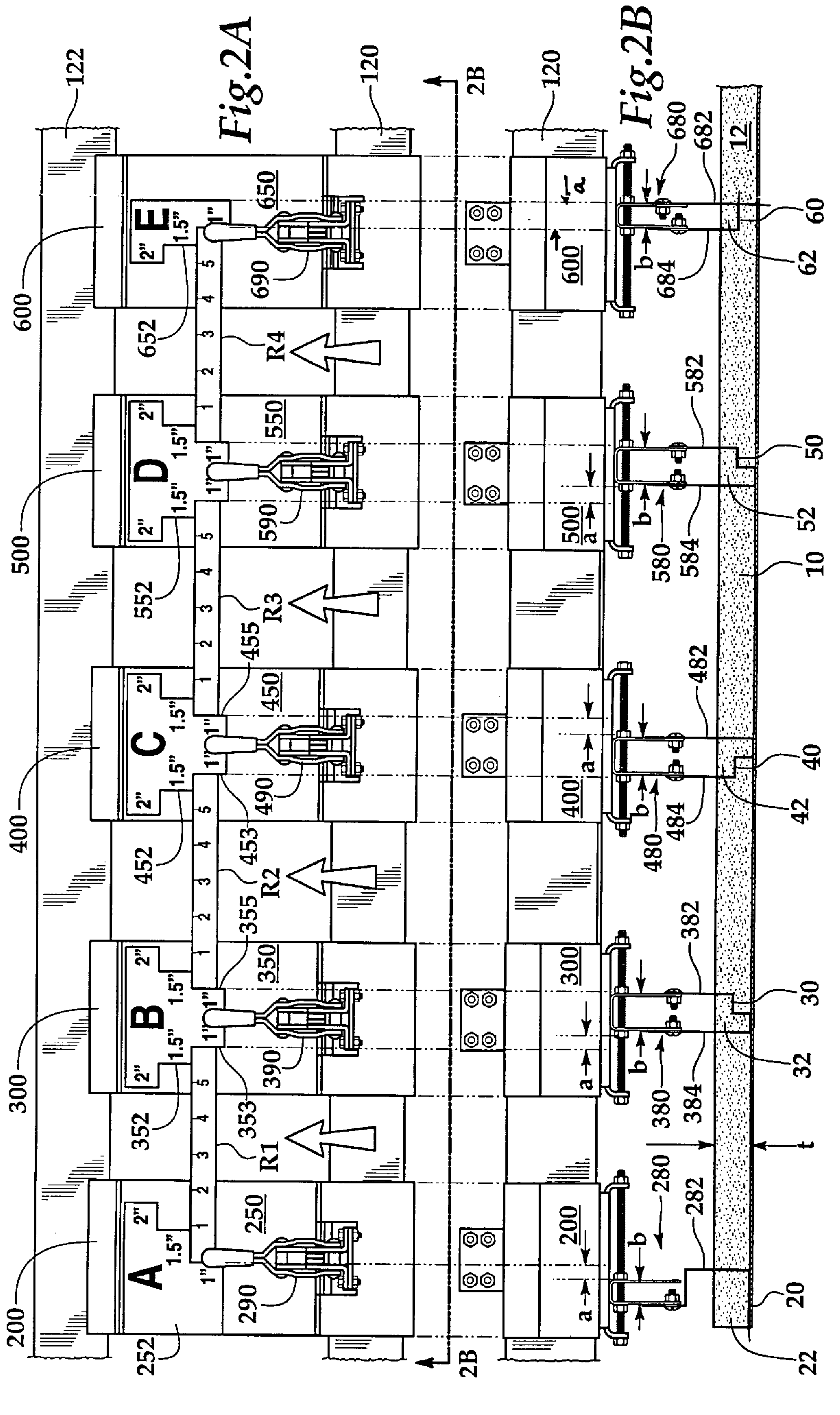
FIG. 2A is a top view of a plurality of the tool holders and a tab system of the present invention positioned on parallel tool bars of the board cutting machine of FIG. 1A.
FIG. 2B is a section view of the tool holders of FIG. 2A looking at the front edge of the blades. The fiber board is illustrated as it would appear with the grooves as cut after passing through the blades.

Referring now to FIG. 2A, therein is illustrated a top view of a portion of tool bars 120 and 122 with the tool holders 200, 300, 400, 500, and 600 adjustably positioned thereon. Referring also to FIG. 2B, there is illustrated a section view of the tool holders 200, 300, 400, 500 and 600 positioned on tool bar 120. FIG. 2B is looking at the front edge of the blades. The fiber board 10 is illustrated as it would appear with the grooves as cut therein after passing through the blades.

The tool holders 200 through 600 may be positioned along the tool bar in different positions in order to position blade assemblies 280, 380, 480, 580 and 680 at different positions in relation to the board 10, and thereby adjust the position of grooves 20, 30, 40, 50, and 60. Adjusting the location of the grooves on the board 10 allows for the formation of HVAC duct work of differing sizes and configurations.

The configuration of blades 282, 382, 384, 482, 484, 582, 584, 682 and 684 are well known in the art and described in U.S. Pat. No. 3,605,534 (particularly in FIGS. 11A through 18A thereof). It will also be appreciated by those skilled in the art that there are other additional blade configurations that are known in the art used to cut grooves having different profiles used to form HVAC duct work of differing cross sectional profiles, or to form grooves and cuts necessary for forming corners, and Tee intersections as taught in U.S. Pat. No. 3,605,534 and known in the art.

It will be understood that any number of tool holders may be positioned on the tool bar 120 and 122 to form an almost infinite number of arrangements for grooving the board 10. It will be understood by those skilled in the art that board cutting machines may have a single tool holder bar of any configuration and the tool holder assembly may have different configurations.

As illustrated in FIGS. 1A and 2A, the tool holders 200, 300, 400, 500, and 600 are held in place with clamp mechanisms 290, 390, 490, 590 and 690. The clamp mechanism 390 is illustrated in more detail in FIG. 6. Such clamps are well known in the art. It will be appreciated by those skilled the art that any clamping mechanism may be used to secure the tool holders to the tool bar or bars. Clamping mechanism 390 is secured to tool holder 300 by bracket 392.

The body of tool holder 200 is identical and interchangeable with tool holders 300, 400, 500 and 600. The only difference in the tool holder being in the blade assemblies 280, 380, 480, 580 and 680 and the corresponding tab indicators 252, 352, 452, 552 and 652. The interchangeable nature of the body of tool holders 200, 300, 400, 500 and 600 is an important advantage over the prior art tool holders and will be discussed in more detail later in this application.

Referring now to FIGS. 3 through 7, wherein the tool holder 300 of the present invention is illustrated. The tool holder is comprised of a first member 322 having a bottom 324, two parallel upstanding walls 326 and 328 disposed transverse to the longitudinal axis of the tool holder, and which terminate in outwardly disposed flanges 332 and 334 sized and adapted to be received on tool bars 122 and 120, respectively. The bottom 324 includes outwardly and downwardly turned side members 342 and 344 disposed longitudinally. Side members 342 and 344 serve as brackets for securing the blade assembly 380 to tool holder 300. Disposed between upstanding walls 326 and 328 is shelf 350. The shelf 350 may be secured by any conventional manner such as welding, brazing, riveting or by use of the threaded fasteners. The shelf 350 holds tab 352. Tab 352 is an important feature of the tab system of the present invention and will be discussed in more detail later in the application.

Turning now to the important adjustment mechanism 370. The downwardly disposed side members 342 and 344 of member 322 include openings for receiving threaded rods 372 of the adjustment mechanism. It will be understood that threaded machine screws or bolts may be substituted for rods 372. Rods are secured in place in the tool holder 300 by nuts 374 or alternative means.

Figure 5:
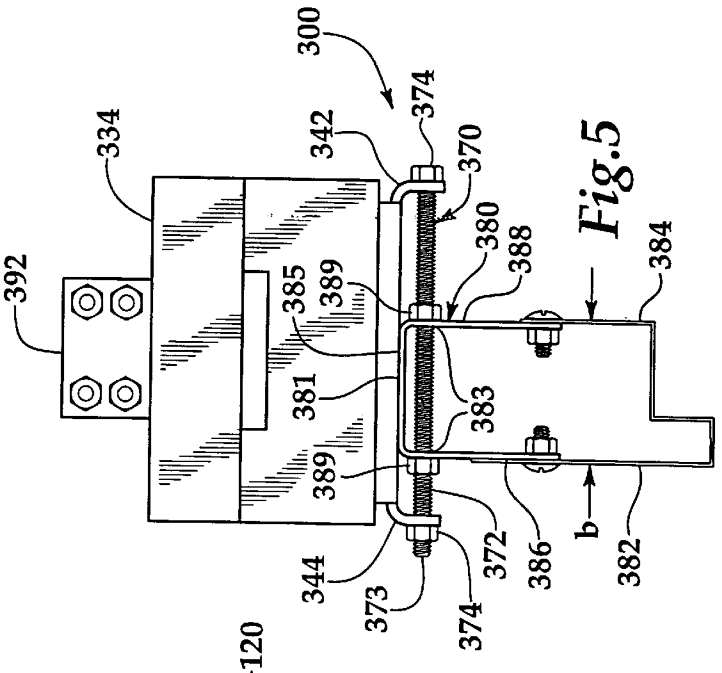
FIG. 5 is an end view of the tool holder of FIG. 3 looking at the front edge of the blade.
Figure 3:
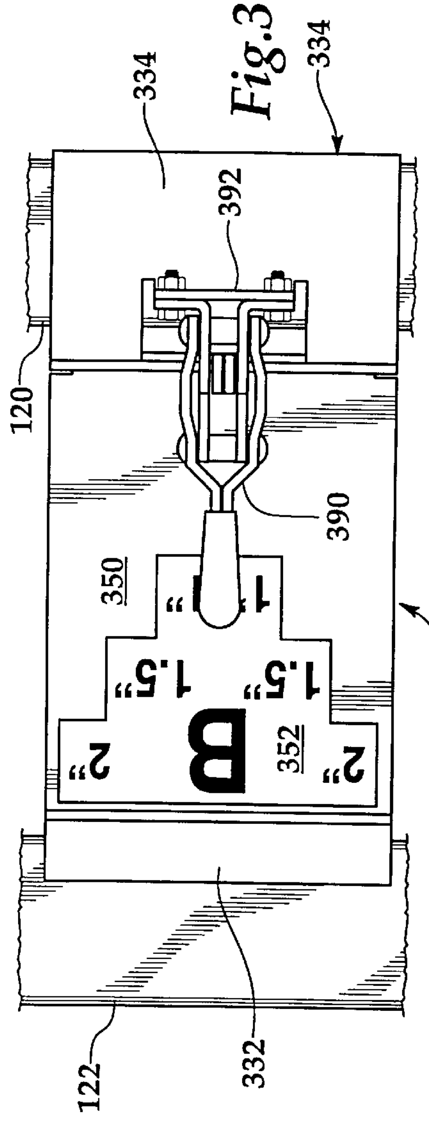
FIG. 3 is a top view of the tool holder and one of the tabs of the present invention.
Figure 4:
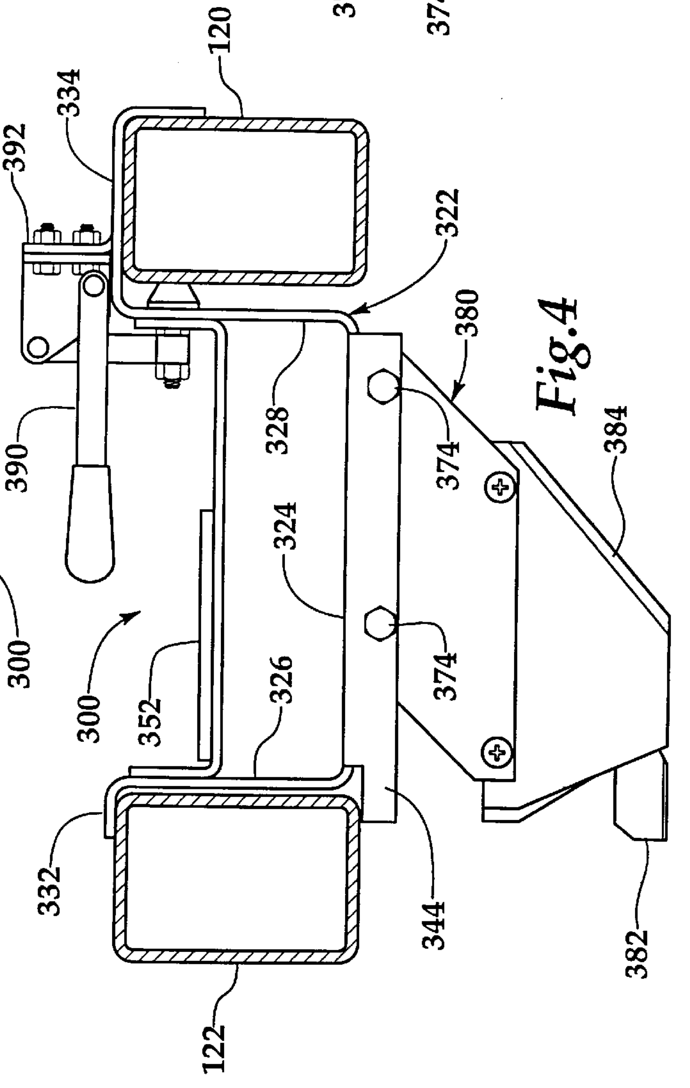
FIG. 4 is a side view of the tool holder of FIG. 3.
Figure 6:
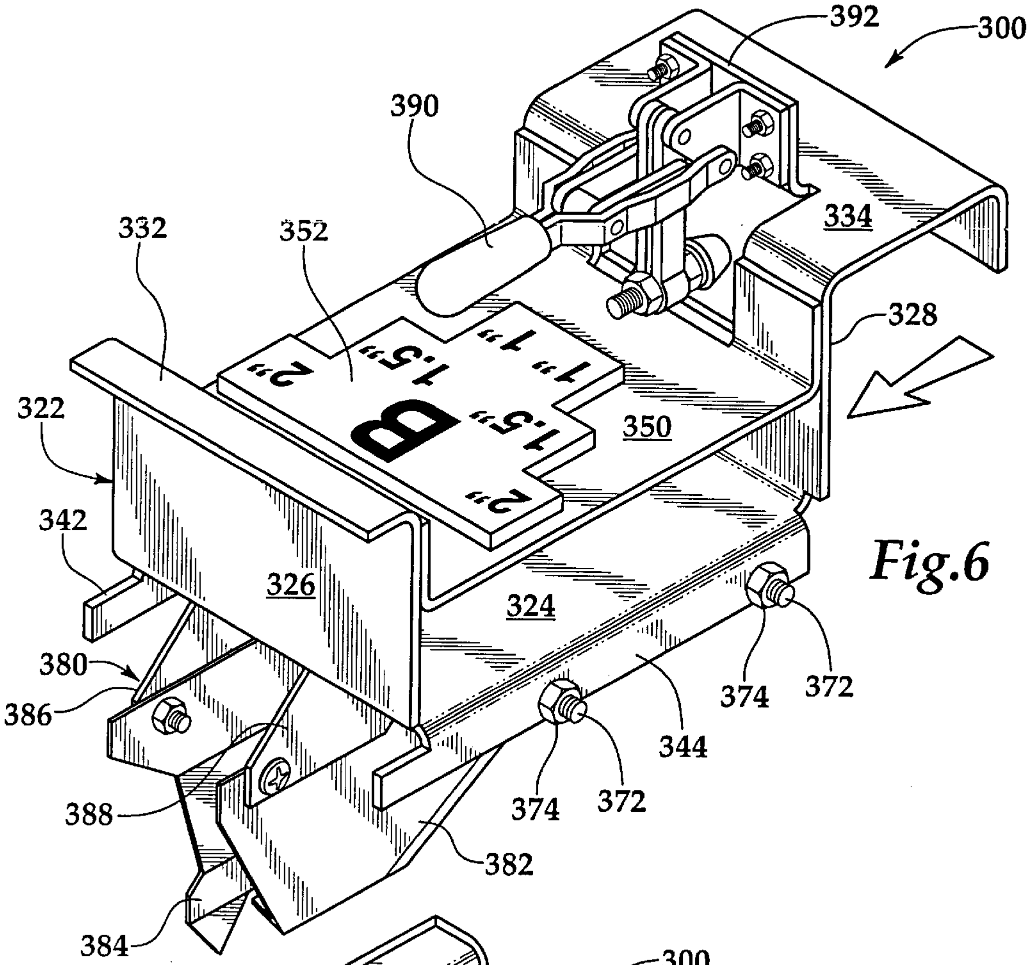
FIG. 6 is a perspective view looking down on the top of the tool holder and one of the tabs of the present invention.
Figure 7:
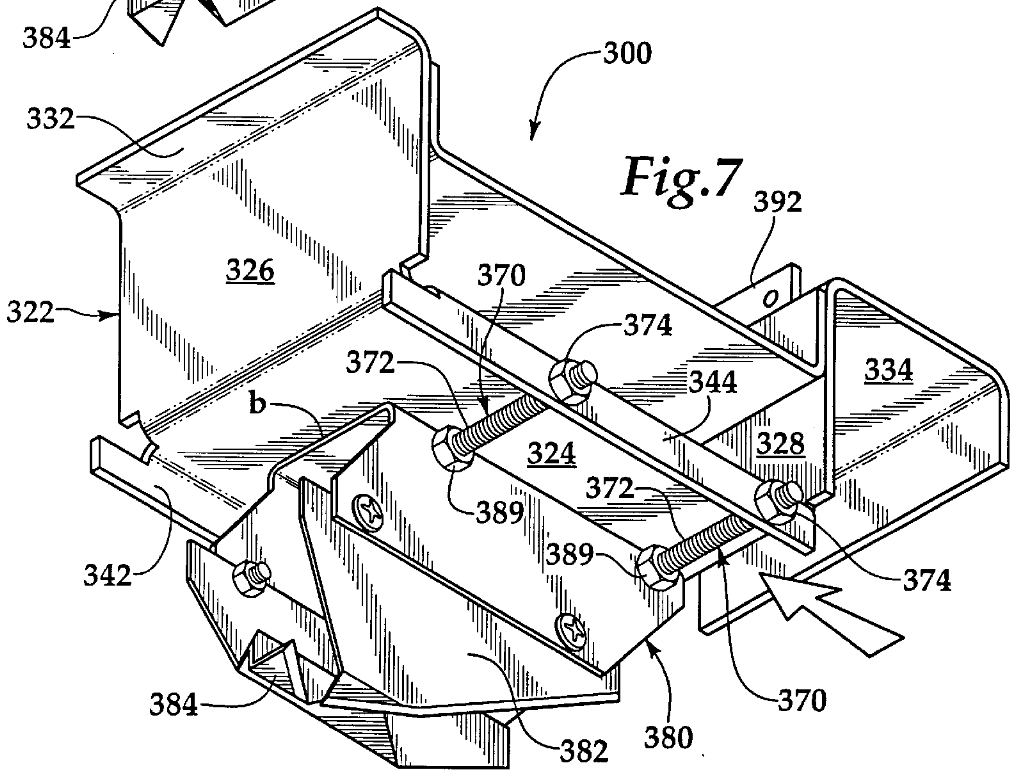
FIG. 7 is a perspective view looking up on the bottom of the tool holder of the present invention.

The blade assembly 380 is comprised of an attachment member also known as a skid 381 (see FIG. 5) formed from a channel section 385 with the legs 386 and 388 disposed downwardly (see FIGS. 5 and 6). It will be understood that the legs of the channel may be disposed upwardly or other structural equivalents including, but not limited to, two sections of angle may be used for the skid. Additionally, two plates held in position with threaded nuts may be used as a skid assembly. It will be understood by those skilled in the art that skid 381 of the blade assembly may be formed as a solid block with openings therethrough to receive the threaded rods or pairs of opposed brackets or other functional equivalents. It will also be understood by those skilled in the art that the width (b) of the base of the channel 385 between the legs 386 and 388 will vary depending on the desired width of the grooves 10, 20, 30, 40, 50 and 60 (see also FIG. 2B). The width of the grooves has been empirically determined as a function of the thickness (t) of the board 10.

Referring to FIG. 5, the leg members 386 and 388 of skid 381 include openings 383 for passing rods 372 therethrough. The adjustment mechanism's internally threaded nuts 389 may be rotated to move them on the rod 372 thereby repositioning blade assembly 380 transverse to the longitudinal axis of tool holder 300 and transverse to the direction of feed of board 10. The blade assembly further includes blades 382 and 384 that are attached to leg members 386 and 388 by any conventional means such as welding, riveting or as indicated herein by the use of conventional bolts and nuts. By adjusting the position of blade assembly 380 the position of blades 382 and 384 are adjusted transverse to the direction of feed of board 10.

In the embodiment illustrated, the blade is illustrated as fixed to the skid. However, it will be understood by those skilled in the art that the blade may be adjustably mounted to the skid or, alternatively, a rolling blade such as the type used on a conventional hand-held pizza cutter may be used in the practice of the present invention.

In order to appreciate the advantages of the tool holder 300 of the present invention it is important to illustrate the prior art tool holders and discuss the limitations thereof.

Figures 8A, 8B:
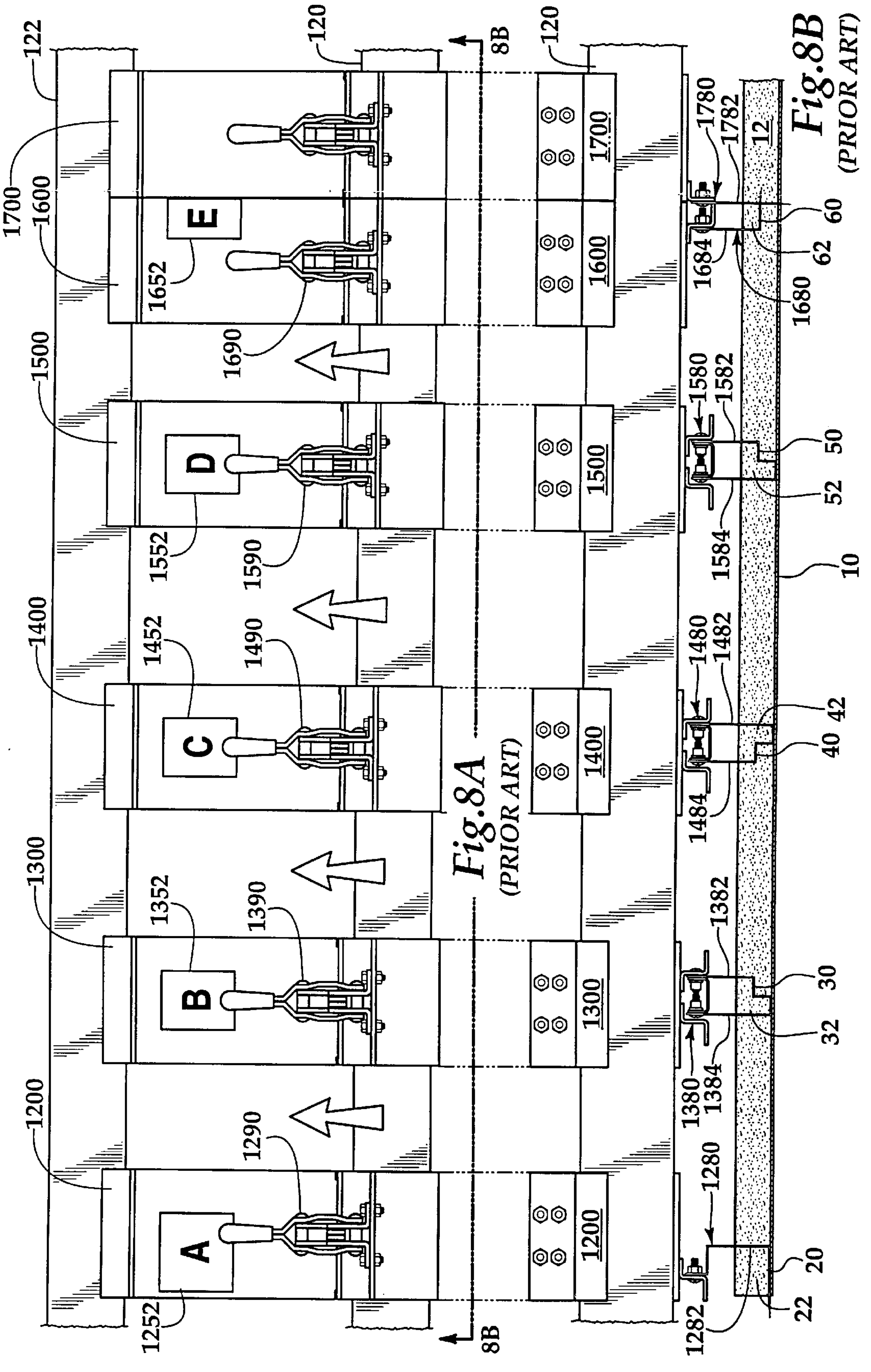
Fig. 8A (PRIOR ART)
Fig. 8B (PRIOR ART)
FIG. 8A is a top view of a plurality of prior art tool holders and a prior art tab system positioned on parallel tool bars of the board cutting machine of FIG. 1A.
FIG. 8B is a section view of the prior art tool holders of FIG. 8A looking at the front edge of the blades. The fiber board is illustrated as it would appear with the grooves as cut after passing through the blades.

Referring now to FIG. 8A, therein is illustrated a top view of a portion of tool bars 120 and 122 with prior art tool holders 1200, 1300, 1400, 1500, 1600 and 1700 adjustably positioned thereon. Referring also to FIG. 8B, therein is illustrated a section view of tool holders 1200, 1300, 1400, 1500, 1600 and 1700 positioned on tool bars 120 and 122. FIG. 8B is looking at the front edge of the blades. The fiber board 10 is illustrated as it would appear with the grooves as cut therein after passing through the blades.

The tool holders may be positioned along the tool bars 120 and 122 in different positions in order to position blade assemblies 1280, 1380, 1480, 1580, 1680 and 1780 at different positions in relation to the board 10.

As illustrated in FIGS. 8A and 8B, the tool holders 1200, 1300, 1400, 1500, 1600 and 1700 are held in place by a clamping mechanism 1290, 1390, 1490, 1590, 1690 and 1790. Clamping mechanism 1390 is secured to tool holder 1300 by bracket 1392 (FIG. 9).

Tool holder 1300 is similar to, but not interchangeable with, tool holders 1200, 1400, 1500, 1600 and 1700. Blade assemblies 1280, 1380, 1480, 1580, 1680 and 1780 are fixed by welding to the respective tool holder and the position of the blades is not adjustable in relation to the tool holder. Tabs 1252, 1352, 1452, 1552 and 1652 are different for each respective tool holder.

Figure 11:
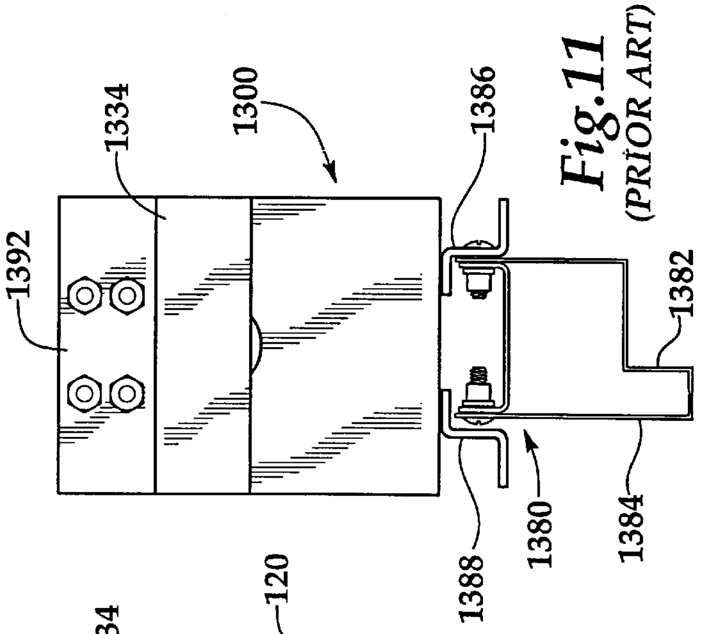
Fig.11 (PRIOR ART)
FIG. 11 is an end view of the prior art tool holder of FIG. 9 looking at the front edge of the blade.
Figure 9:
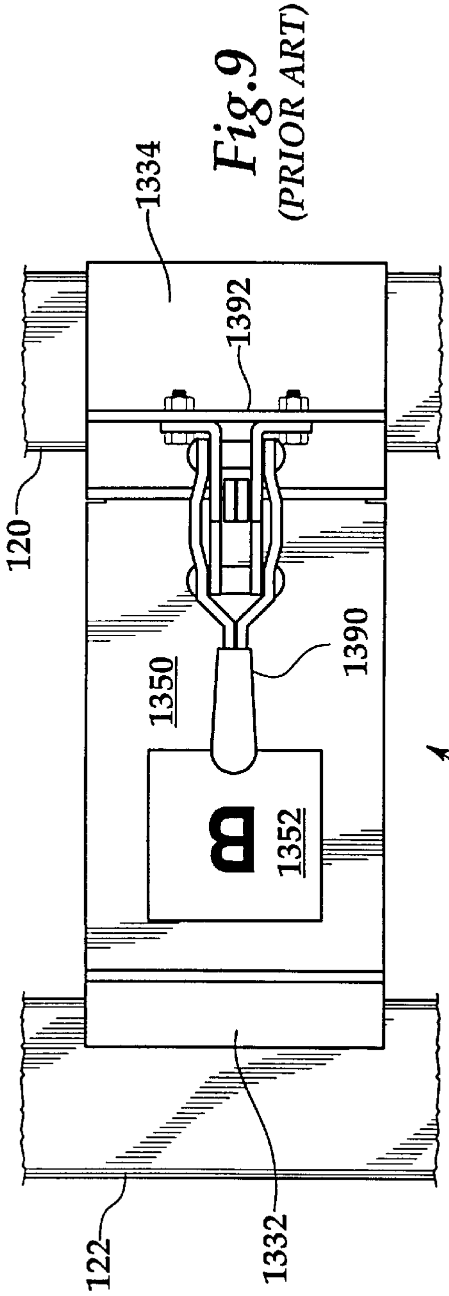
Fig.9 (PRIOR ART)
FIG. 9 is a top view of the prior art tool holder.
Figure 10:
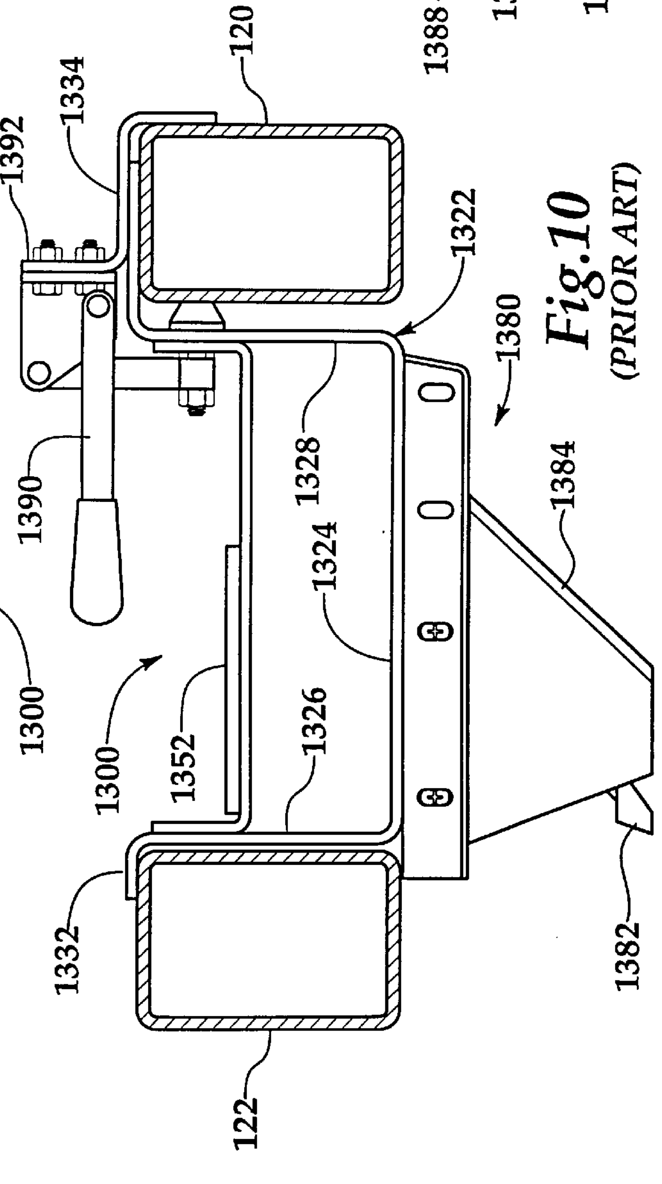
Fig.10 (PRIOR ART)
FIG. 10 is a side view of the prior art tool holder of FIG. 9.

Referring now to FIGS. 9, 10 and 11, wherein the prior art tool holder 1300 is illustrated in more detail. The tool holder is comprised of a first member 1322 having a bottom 1324, two parallel upstanding walls 1326 and 1328 which terminate in outwardly disposed flanges 1332 and 1334, sized and adapted to be received on tool bars 122 and 120, respectively.

Disposed between upstanding walls 1326 and 1328 is shelf 1350. The shelf 1350 holds tab 1352. As illustrated in FIG. 8A, tabs 1252, 1352, 1452, 1552 and 1652 are different and must be customized for each respective tool holder.

Disposed on the lower surface of bottom 1324 are two blade holder brackets 1386 and 1388. Blades 1382 and 1384 are attached to brackets 1386 and 1388 by any conventional means such as welding, riveting or as indicated herein by the use of conventional bolts and nuts.

When the prior art tool holder 1200 is assembled, the blade assembly 1280 is permanently fixed to the base of the tool holder. The tool holder is placed on the tool bars 120 and 122 on the machine 100. The fiber board 10 is fed into the machine and the position of the groove 20 is noted (see FIG. 2B). The tab 1252 is then positioned on the top shelf 1250 of the tool holder to indicate where the cut is made. Next, a tool holder 1300 is assembled and the blade assembly 1380 is permanently affixed to the tool holder 1300. By trial and error, tool holder by tool holder, the proper tab position is determined and the tab is fixed. The tab 1352 is positioned on the shelf 1350 to indicate where the groove 30 has been cut. This process is followed for each of the tool holders 1400, 1500 and 1600. It is important to understand that each of the prior art tool holders is individually customized in order to generate a matched set necessary to manufacture the fiber board with the grooves 20, 30, 40, 50 and 60. Tool holder 1700 is used to hold blade assembly 1780 having a cutoff blade 1782 for cutting off the end of board 100. In alternate prior art embodiments, blade 1782 is mounted on tool holder 1600. It will be understood by those skilled in the art that often a matched set of eight tool holders is sold with machine 100. The additional tool holders are used to make different cut configurations and also for use in cutting excess board piece 12 into a usable product configuration.

The fiber board 10 is typically manufactured in 1 inch, 1½ inch and 2 inch thickness. The distance between the feed rollers of machine 100 can be adjusted in order to accommodate different thicknesses of board 10. Different blades 1282, 1382, 1482, 1582 and 1782 and 1384, 1484, 1584 and 1684, and blade assemblies 1280, 1380, 1480, 1580, 1680 and 1780 must be used with each thickness of fiber board 10. When using a prior art tool holder system, it is necessary to have a matched set of tool holders for each thickness. This means that in order for maximum flexibility it is necessary to have at least five or more tool holders for each thickness.

The improved tool holder 200 of the present invention has the advantage that the tool holder bodies 200, 300, 400, 500 and 600 can be used interchangeably by replacing the adjustable blade assemblies. The tool holders 200, 300, 400, 500 and 600 may also be used for 1 inch, 1½ inch, 2 inch and other thicknesses of fiber board by changing the blade assembly and without adjusting the height of the tool holder bars above the board to be cut.

Referring now to FIGS. 3 through 7, when the tool holder 300 is assembled, the tab 352 is fixed to the top shelf 350. The blade assembly 380 is adjustably mounted on the tool holder. Subsequent to fixing the tab 352, the blade assembly 380 is adjusted by rotating the nuts 389 which allows the skid 381 and blades 382 and 384 to move into the desired position into alignment with the tab indicator 352. Referring to FIGS. 2A, 3, 4 and 5 when tool holder 300 is assembled, the tab 352 is fixed to the top shelf 350. The blade assembly 380 is adjustably mounted on the tool holder. The blade assembly is adjusted by rotating the nuts 389 which allows the skid 381 and blades 382 and 384 into the desired position into alignment with the tab indicator 352. This process is followed for each of the tool holders 400, 500 and 600 (and other holders making up a set).

When a blade breaks in the tool holder of the present invention, the blade is replaced on the blade assembly 380 and the assembly is adjusted such that the blade aligns with the tab 352. Likewise, if a blade breaks on one of the other tool holders 200, 400, 500, or 600, the blade is replaced on the blade assembly 280, 480, 580 or 680 and then repositioned into alignment with the tab 252, 452, 552 or 652.

Additionally, if a user of the machine desires to change from cutting fiber board 10 of one thickness to a different thickness, it is not necessary to purchase an additional set of five more tool holders. The blade assemblies 280, 380, 480, 580 and 680 for one thickness are removed and the skids 281, 381, 481, 581 and 681 (FIGS. 2A, and 3 through 5) for one thickness is removed. A blade assembly 380, including the skid 381, and blades 382 and 384, is inserted on the threaded rod 372 and positioned in alignment with the tab 352. In a similar manner, the remaining tool holders in the set are retrofitted with blade assemblies for the different thickness of fiber board. Such interchangeability and retrofitting is made possible by the adjustable mounting of the blade assembly 380 in conjunction with the unique design of the tabs 252, 352, 452, 552 and 652.

When using a prior art tool holder, if a machine operator desired to cut a board 10 of different thickness, it was necessary to raise or lower the tool bar or bars to adjust the positioning of the bar or bars in relation to the board to be cut. With the tool holder of the present invention, it is not necessary to adjust the tool bar for different thickness of material. In a new machine manufactured in accordance with the present invention, the bar is initially fixed in the highest position which will accommodate the passage of fiber board of multiple thicknesses. In the retrofit of a prior art machine, the tool bar is raised to the highest adjustment which will accommodate the passage of fiber board of multiple thicknesses. The tool holder blade assembly is removed and a blade assembly designed for the desired thickness material is installed. The blade assembly 380 of the present invention includes the skid 381 having leg members 386 and 388. The length of the leg members 386 and 388, extending in a downwardly direction, is carefully selected in order to position the blades 382 and 384 attached thereto correctly in relation to the board.

Referring to FIG. 2A and FIGS. 12 to 14, each of the tabs 252, 352, 452, 552 and 652 include a step design with tab settings indicated for 1 inch, 1½ inch and 2 inch thick fiber board. Since each tab includes tab settings for all three common thickness and is permanently affixed to the tool holder, one tool holder is capable for use in any position with any thickness merely by changing the blade assembly and bringing it into alignment with the tab indicator.

Use of the tool holders 200, 300, 400, 500 and 600, including tab indicators 252, 352, 452, 552 and 652 and blade assemblies 280, 380, 480, 580 and 680 as an integrated system, is illustrated in FIGS. 2A and 2B. In order to simplify operation of the cutting machine 100, the inventor has labeled tab 252 as tab A; tab 352 as tab B; tab 452 as tab C; tab 552 as tab D; and tab 652 as tab E. Therefore, the operator can easily know the position of the tool holder in the series used to make the necessary cuts to form the square duct of FIG. 1B. A series of rulers $R_1$, $R_2$, $R_3$ and $R_4$ illustrate how the operator of the machine 100 uses the improved tool holders 200, 300, 400, 500, and 600 of the subject invention. If a square duct, such as the one illustrated in FIG. 1B, is to be constructed from 1 inch thick fiber board 10 and the desired interior dimension is to be 6 inches inside from wall intersection to wall intersection, the operator positions tool holder 200 against a stop of the machine 100 and measures six inches between the 1 inch tab indicator mark on tab A and the 1 inch tab indicator on tab B. Likewise for tabs C, D and E. The unique design of the tabs takes into account the calculations necessary for positioning the blade assemblies to cut the desired grooves 20, 30, 40, 50 and 60 in board 10.

Figure 13:
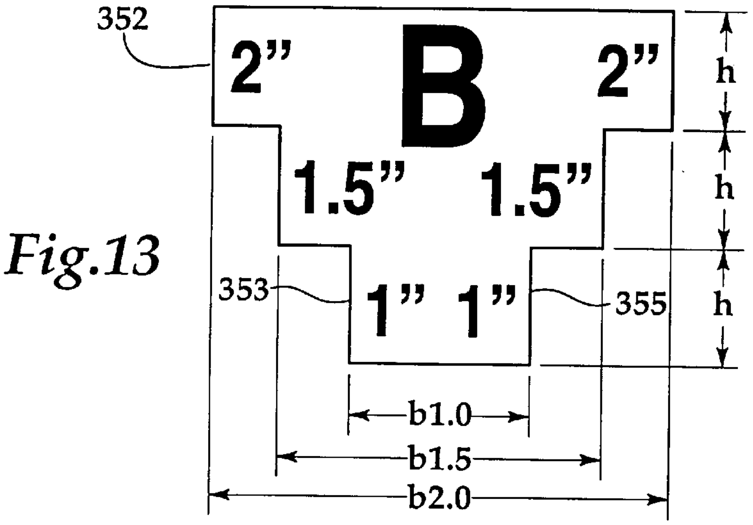
FIG. 13 is a top view of another of the tabs of the tab system of the present invention.

Referring to FIGS. 2A, 2B and FIG. 13, it will be understood by those skilled in the art that the right side and left side indicator marks 353 and 355 of tab 352 does not necessarily indicate that blades 382 and 384 are positioned directly below the tab indicator mark. Indeed, one of the features of the tab system of the present invention is that when the tool holders 300, 400, 500, etc. are positioned using the $R_2$, $R_3$ (desired inner duct dimensions) between tab indicator marks 355 and 453, the position of the blades will automatically be positioned to make the desired predetermined cut spacings necessary to form the completed duct as illustrated in FIG. 1B. As illustrated in FIGS. 2A and 2B, the position of blade 384 is offset by the distance (a) from the edge of tab indicator mark 353, while blade 382 is positioned directly below tab indicator mark 355. The offset distance (a) is equal to one-half the thickness (t) of the board 10 being cut. FIGS. 2A and 2B illustrate a like manner of the offset distance (a) for tabs 252, 452 and 552. The tab 652 does not have an offset a.

Figure 12:
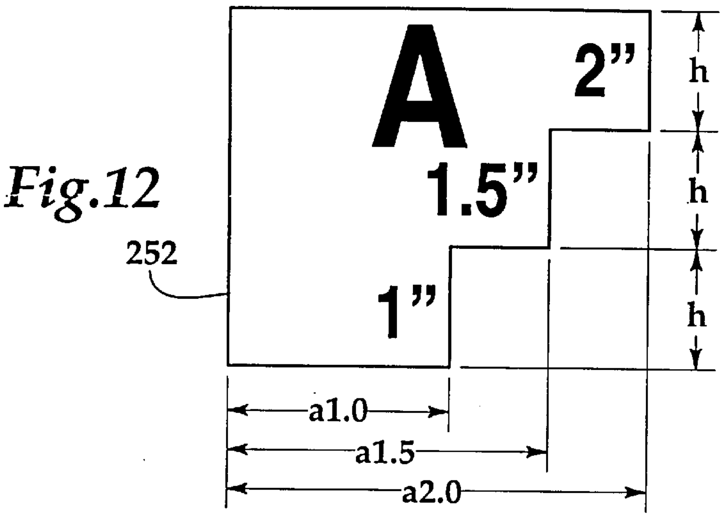
FIG. 12 is a top view of one of the tabs of the tab system of the present invention.

Referring now to FIG. 12, therein is indicated a top view of tab A. The critical measurements for the unique three step profile are $a_1$ of 2.1250 inches; $a_{1.5}$ of 2.875 inches and $a_2$ of 3.625. The height dimension of the tab is irrelevant to the calculation and placement of the grooves. In the embodiment illustrated, the height of each step on the tab is 1 inch. Calculation of the $a_1$ distance of a 1 inch thick board is arrived at by adding 1.625 inch+½ the board 100 thickness. The dimension 1.625 inch is determined empirically for a desired flap width. Calculation of the $a_{1.5}$ for a 1½ inch board is arrived at by adding 2.125 inch (empirically determined)+½ the board thickness. Calculation of the $a_1$ for a 2 inch board is arrived at by adding 2.625 inch (empirically determined)+½ the board thickness.

Referring now to FIG. 13, therein is indicated a top view of tabs B, C and D. The critical measurements for the unique three step profile are $b_1$ of 1.625 inch; $b_{1.5}$ of 2.5625 inch and $b_2$ of 3.500. The height dimension of the tab is irrelevant to the calculation and placement of the grooves. In the embodiment illustrated, the height h is 1 inch. Calculation of the $b_{1.0}$ distance of a 1 inch thick board is arrived at by adding 1.125 inch (desired groove width determined empirically)+½ the board thickness. Calculation of the $b_{1.5}$ for a 1½ inch board is arrived at by adding 1.8125 inch (empirically determined)+½ the board thickness. Calculation of the $b_{2.0}$ for a 2 inch board is arrived at by adding 2.5 inch (empirically determined)+½ the thickness of the board.

Figure 14:
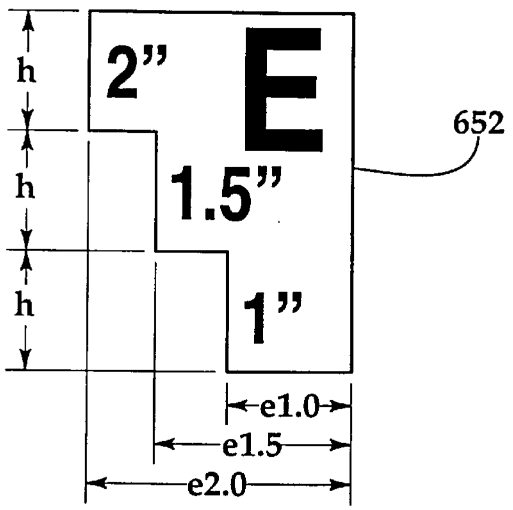
FIG. 14 is a top view of another of the tabs of the tab system of the present invention.

Referring now to FIG. 14, therein is indicated a top view of tab E. The critical measurements for the unique three step profile are $e_{1.0}$ of 0.7500 inch; $e_{1.5}$ of 1.250 inch and $e_{2.0}$ of 1.75. The height dimension of the tab is irrelevant to the calculation and placement of the grooves. In the embodiment illustrated, the h is 1 inch. Calculation of the $e_{1.0}$ distance of a 1 inch thick board is arrived at by subtracting ¼ inch from the thickness of the board. Calculation of the $e_{1.5}$ for a 1½ inch board is arrived at by subtracting ¼ inch from the thickness of the board. Calculation of the $e_{2.0}$ for a 2 inch board is arrived at by subtracting ¼ inch from the thickness of the board. It will be readily apparent that the principles disclosed in this invention may be applied to board thickness other than 1 inch, 1½ inch and 2 inch by applying the appropriate mathematical calculations as disclosed herein. It will also be apparent to one skilled in the art that not only insulation fiber board may be cut and manufactured in accordance with the teachings of the present invention, but other board materials which require precision cutting may use the principles taught by the present invention. It will be apparent to those skilled in the art that the tool holder and tab system of the present invention may be used with newly manufactured cutting machines and/or used as retrofit equipment for prior art cutting machines.

A preferred embodiment of the invention has been illustrated in the accompanying Drawings and described in the foregoing Detailed Description, it will be understood that the invention is not limited to the embodiment disclosed, but is capable of numerous modifications without departing from the scope of the invention as claimed.

What is claimed is:

1. An improved board cutting machine for cutting a board, said board cutting machine having at least one first member feed roller journaled and mounted in a first member and at least one second member feed roller journaled and mounted in a second member, wherein the feed rollers are positioned transverse to the direction of feed for the board to be cut, and wherein the position of said second member relative to said first member is adjustable, said board cutting machine further including a at least one blade positioned for cutting the board passing through the first member feed roller and the second member feed roller, said improvement comprising:

- a rotational power source;
- a first member first sprocket rotatably attached to said first member;
- a first member second sprocket rotatably attached to said first member;
- a first member third sprocket rotatably attached to said first member;
- a second member first sprocket rotatably attached to said second member and positioned below said first member first sprocket;
- a second member second sprocket rotatably mounted to said second member and positioned above said first member second sprocket;
- a continuous loop flexible drive member engaging, in order, the first member first sprocket, the second member first sprocket, the second member second sprocket, the first member second sprocket, and the first member third sprocket;
- wherein said rotation power source is connected to apply rotational power to one from the group consisting of the first member first sprocket, the first member second sprocket, the first member third sprocket, the second member first sprocket, and the second member second sprocket;
- wherein said first member feed roller is connected in a fixed relationship to one from the group consisting of the first member first sprocket, the first member second sprocket, the first member third sprocket, the second member first sprocket, and the second member second sprocket; and
- wherein a distance traversed by the flexible drive member is substantially constant throughout a range of adjustment of said second member.

2. The improved board cutting system according to claim 1, wherein the direction of travel for said continuous loop flexible drive member between the first member first sprocket and the second member first sprocket is substantially parallel to the direction of travel for the continuous loop flexible drive member between the second member second sprocket and the first member second sprocket.

3. The improved board cutting system according to claim 2, wherein the direction of travel for said continuous loop flexible drive member between the first member first sprocket and the second member first sprocket is substantially parallel to the direction of travel for the continuous loop flexible drive member between the second member second sprocket and the first member second sprocket throughout a range of said adjustment of said second member.

4. The improved board cutting system according to claim 2, wherein the direction of travel for said continuous loop flexible drive member between the first member first sprocket and the second member first sprocket and the direction of travel for the continuous loop flexible drive member between the second member second sprocket and the first member second sprocket are substantially perpendicular to the feed direction for the board.

5. The improved board cutting system according to claim 2, wherein the direction of travel for said continuous loop flexible drive member between the first member first sprocket and the second member first sprocket and the direction of travel for the continuous loop flexible drive member between the second member second sprocket and the first member second sprocket are substantially parallel to the direction of adjustment of the second member.

6. The improved board cutting system according to claim 1, wherein said second member is adjustable into positions that align perpendicular to the direction of feed for the board.

7. The improved board cutting system according to claim 6, wherein the direction of travel for said continuous loop flexible drive member between the first member first sprocket and the second member first sprocket and the direction of travel for the continuous loop flexible drive member between the second member second sprocket and the first member second sprocket are substantially parallel to the direction of adjustment of the second member.

8. The improved board cutting system according to claim 1, wherein said first member third sprocket includes a bottom side positioned below said second member first sprocket.

9. The improved board cutting system according to claim 1, wherein said first member roller is connected in a fixed relationship to the first member second sprocket.

10. The improved board cutting system according to claim 9, further including a first member transfer sprocket connected in a fixed relationship to the first member second sprocket, a first member second roller journaled and mounted in the first member; a first member fourth sprocket connected in a fixed relationship to the first member second roller; a first member continuous loop flexible transfer member engaging the first member transfer sprocket and the first member fourth sprocket.

11. The improved board cutting system according to claim 1, further including a second member roller connected in a fixed relationship to the second member first sprocket.

12. The improved board cutting system according to claim 11, further including a second member transfer sprocket connected in a fixed relationship to the second member first sprocket, a second member second roller journaled and mounted in the second member; a second member third sprocket connected in a fixed relationship to the second member second roller; a second member continuous loop flexible transfer member engaging the second member transfer sprocket and the second member third sprocket.

13. An improved board cutting machine for cutting a board, said board cutting machine having at least one first member feed roller journaled and mounted in a first member and at least one second member feed roller journaled and mounted in a second member, wherein the feed rollers are positioned transverse to the direction of feed for the board to be cut, and wherein the position of said second member relative to said first member is adjustable, said board cutting machine further including a at least one blade positioned for cutting the board passing through the first member feed roller and the second member feed roller, said improvement comprising:

a rotational power source;

a first member first sprocket rotatably attached to said first member;

a first member second sprocket rotatably attached to said first member;

a first member third sprocket rotatably attached to said first member;

a second member first sprocket rotatably attached to said second member and positioned below said first member first sprocket;

a second member second sprocket rotatably mounted to said second member and positioned above said first member second sprocket;

a continuous loop flexible drive member engaging, in order, the first member first sprocket, the second member first sprocket, the second member second sprocket, the first member second sprocket, and the second member third sprocket;

wherein said rotation power source is connected to apply rotational power to one from the group consisting of the first member first sprocket, the first member second sprocket, the first member third sprocket, the second member first sprocket, and the second member second sprocket; and wherein said second member feed roller is connected in a fixed relationship to one from the group consisting of the first member first sprocket, the first member second sprocket, the first member third sprocket, the second member first sprocket, and the second member second sprocket; and wherein a distance traversed by the flexible drive member is substantially constant throughout a range of adjustment of said second member.

14. The improved board cutting system according to claim 13, wherein the direction of travel for said continuous loop flexible drive member between the first member first sprocket and the second member first sprocket is substantially parallel to the direction of travel for the continuous loop flexible drive member between the second member second sprocket and the first member second sprocket.

15. The improved board cutting system according to claim 14, wherein the direction of travel for said continuous loop flexible drive member between the first member first sprocket and the second member first sprocket is substantially parallel to the direction of travel for the continuous loop flexible drive member between the second member second sprocket and the first member second sprocket throughout a range of said adjustment of said second member.

16. The improved board cutting system according to claim 14, wherein the direction of travel for said continuous loop flexible drive member between the first member first sprocket and the second member first sprocket and the direction of travel for the continuous loop flexible drive member between the second member second sprocket and the first member second sprocket are substantially perpendicular to the feed direction for the board.

17. The improved board cutting system according to claim 14, wherein the direction of travel for said continuous loop flexible drive member between the first member first sprocket and the second member first sprocket and the direction of travel for the continuous loop flexible drive member between the second member second sprocket and the first member second sprocket are substantially parallel to the direction of adjustment of the second member.

18. The improved board cutting system according to claim 13, wherein said second member is adjustable into positions that align perpendicular to the direction of feed for the board.

19. The improved board cutting system according to claim 18, wherein the direction of travel for said continuous loop flexible drive member between the first member first sprocket and the second member first sprocket and the direction of travel for the continuous loop flexible drive member between the second member second sprocket and the first member second sprocket are substantially parallel to the direction of adjustment of the second member.

20. The improved board cutting system according to claim 13, wherein said first member third sprocket includes a bottom side positioned below said second member first sprocket.

21. The improved board cutting system according to claim 13, wherein said second member roller is connected in a fixed relationship to the second member first sprocket.

22. The improved board cutting system according to claim 21, further including a second member transfer sprocket connected in a fixed relationship to the second member first sprocket, a second member second roller journaled and mounted in the second member; a second member third sprocket connected in a fixed relationship to the second member first roller; a second member continuous loop flexible transfer member engaging the second member transfer sprocket and the second member third sprocket.

23. An improved board cutting machine for cutting a board, said board cutting machine having at least one upper feed roller journaled and mounted in an adjustable member and at least one lower feed roller journaled and mounted in a fixed member, wherein the feed rollers are positioned transverse to the direction of feed for the board to be cut, said board cutting machine further including a at least one blade positioned for cutting the board passing through the upper feed roller and the lower feed roller, said improvement comprising:

a rotation power source having a drive sprocket;

a fixed member first sprocket rotatably attached to said fixed member;

a fixed member second sprocket rotatably attached to said fixed member;

an adjustable member first sprocket rotatably attached to said adjustable members and positioned below the fixed member first roller;

an adjustable member second sprocket rotatably mounted to said adjustable member and positioned above the fixed member second sprocket;

a continuous loop flexible drive member engaging, in order, the fixed member first sprocket, the adjustable member first sprocket, the adjustable member second sprocket, and the fixed member second sprocket;

wherein the drive sprocket of said rotational power source engages the continuous loop flexible drive member for movement thereof;

wherein said upper feed roller receives rotational power from one of the group consisting of the fixed member first sprocket, the fixed member second sprocket, the adjustable member first sprocket, and the adjustable member second sprocket; and wherein a distance traversed by the flexible drive member is substantially constant through a range of adjustment of said adjustable member.

24. The improved board cutting system according to claim 23, wherein the direction of travel for said continuous loop flexible drive member between the fixed member first sprocket and the adjustable member first sprocket is substantially parallel to the direction of travel for the continuous loop flexible drive member between the adjustable member second sprocket and the fixed member second sprocket.

25. The improved board cutting system according to claim 24, wherein the direction of travel for said continuous loop flexible drive member between the fixed member first sprocket and the adjustable member first sprocket is substantially parallel to the direction of travel for the continuous loop flexible drive member between the adjustable member second sprocket and the fixed member second sprocket throughout a range of said adjustment of said adjustable member.

26. The improved board cutting system according to claim 24, wherein the direction of travel for said continuous loop flexible drive member between the fixed member first sprocket and the adjustable member first sprocket and the direction of travel for the continuous loop flexible drive member between the adjustable member second sprocket and the fixed member second sprocket are substantially perpendicular to the feed direction for the board.

27. The improved board cutting system according to claim 24, wherein the direction of travel for said continuous loop flexible drive member between the fixed member first sprocket and the adjustable member first sprocket and the direction of travel for the continuous loop flexible drive member between the adjustable member second sprocket and the fixed member second sprocket are substantially parallel to the direction of adjustment of the adjustable member.

28. The improved board cutting system according to claim 23, wherein said adjustable member is adjustable into positions that align perpendicular to the direction of feed for the board.

29. The improved board cutting system according to claim 28, wherein the direction of travel for said continuous loop flexible drive member between the fixed member first sprocket and the adjustable member first sprocket and the direction of travel for the continuous loop flexible drive member between the adjustable member second sprocket and the fixed member second sprocket are substantially parallel to the direction of adjustment of the adjustable member.

30. The improved cutting machine according to claim 23, wherein said drive sprocket engages said continuous loop flexible drive member between said adjustable member second sprocket and said fixed member first sprocket.

31. The improved board cutting system according to claim 30, wherein said drive sprocket includes a bottom side positioned below said adjustable member first sprocket.

32. An improved board cutting machine for cutting a board, said board cutting machine having at least one upper feed roller journaled and mounted in an adjustable member and at least one lower feed roller journaled and mounted in a fixed member, wherein the feed rollers are positioned transverse to the direction of feed for the board to be cut, said board cutting machine further including a at least one blade positioned for cutting the board passing through the upper feed roller and the lower feed roller, said improvement comprising:

a rotational power source having a drive sprocket;

a fixed member first sprocket rotatably attached to said fixed member;

a fixed member second sprocket rotatably attached to said fixed member;

an adjustable member first sprocket rotatably attached to said adjustable member and positioned below the fixed member first roller;

an adjustable member second sprocket rotatably mounted to said adjustable members and positioned above the fixed member second sprocket;

a continuous loop flexible drive member engaging, in order, the fixed member first sprocket, the adjustable member first sprocket, the adjustable member second sprocket, and the fixed member second sprocket;

wherein the drive sprocket of said rotational power source engages the continuous loop flexible drive member for movement thereof;

wherein said lower feed roller receives rotational power from one of the group consisting of the fixed member first sprocket, the fixed member second sprocket, the adjustable member first sprocket, and the adjustable member second sprocket; and wherein a distance traversed by the flexible drive member is substantially constant throughout a range of adjustment of said adjustable member.

33. The improved board cutting system according to claim 32, wherein the direction of travel for said continuous loop flexible drive member between the fixed member first sprocket and the adjustable member first sprocket is substantially parallel to the direction of travel for the continuous loop flexible drive member between the adjustable member second sprocket and the fixed member second sprocket.

34. The improved board cutting system according to claim 33, wherein the direction of travel for said continuous loop flexible drive member between the fixed member first sprocket and the adjustable member first sprocket is substantially parallel to the direction of travel for the continuous loop flexible drive member between the adjustable member second sprocket and the fixed member second sprocket throughout a range of said adjustment of said adjustable member.

35. The improved board cutting system according to claim 33, wherein the direction of travel for said continuous loop flexible drive member between the fixed member first sprocket and the adjustable member first sprocket and the direction of travel for the continuous loop flexible drive member between the adjustable member second sprocket and the fixed member second sprocket are substantially perpendicular to the feed direction for the board.

36. The improved board cutting system according to claim 33, wherein the direction of travel for said continuous loop flexible drive member between the fixed member first sprocket and the adjustable member first sprocket and the direction of travel for the continuous loop flexible drive member between the adjustable member second sprocket and the fixed member second sprocket are substantially parallel to the direction of adjustment of the adjustable member.

37. The improved board cutting system according to claim 32, wherein said adjustable member is adjustable into positions that align perpendicular to the direction of feed for the board.

38. The improved board cutting system according to claim 37, wherein the direction of travel for said continuous loop flexible drive member between the fixed member first sprocket and the adjustable member first sprocket and the direction of travel for the continuous loop flexible drive member between the adjustable member second sprocket and the fixed member second sprocket are substantially parallel to the direction of adjustment of the adjustable member.

39. The improved cutting machine according to claim 32, wherein said drive sprocket engages said continuous loop flexible drive member between said adjustable member second sprocket and said fixed member first sprocket.

40. The improved board cutting system according to claim 39, wherein said drive sprocket includes a bottom side positioned below said adjustable member first sprocket.

* * * * *